(12) United States Patent
Sharma et al.

(10) Patent No.: US 12,639,258 B1
(45) Date of Patent: May 26, 2026

(54) LOG STORAGE IN DISTRIBUTED DATA STREAMING SYSTEMS

(71) Applicant: Amazon Technologies, Inc., Seattle, WA (US)

(72) Inventors: Vaibhav Sharma, Sammamish, WA (US); Nagarjuna Koduru, Sammamish, WA (US); Sayantan Chakravorty, Sammamish, WA (US); Sai Maddali, Bothell, WA (US); Usama Bin Naseem, Bothell, WA (US); Divij Vaidya, Berlin (DE); Mehari Beyene, Everett, WA (US); Karthikeyan Rajagopalan, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/902,225

(22) Filed: Sep. 30, 2024

(51) Int. Cl.
*G06F 16/11* (2019.01)

(52) U.S. Cl.
CPC .................................. *G06F 16/113* (2019.01)

(58) Field of Classification Search
CPC .................................................... G06F 16/113
See application file for complete search history.

(56) References Cited

U.S. PATENT DOCUMENTS

| | | | |
|---|---|---|---|
| 6,012,067 A * | 1/2000 | Sarkar | G06F 16/252 |
| 9,575,978 B2 * | 2/2017 | Tevis | G06F 16/13 |

| | | | |
|---|---|---|---|
| 9,729,653 B2 * | 8/2017 | Nampally | H04L 67/1017 |
| 10,037,337 B1 * | 7/2018 | Shanmuganathan | G06F 3/067 |
| 10,976,949 B1 * | 4/2021 | Calhoun, Jr. | G06F 3/0643 |
| 11,042,504 B2 * | 6/2021 | Kashi Visvanathan | G06F 16/2365 |
| 11,582,261 B2 * | 2/2023 | Vivekanandan | H04L 63/1433 |
| 12,348,593 B2 * | 7/2025 | Chakravorty | H04L 65/60 |
| 2005/0091253 A1 * | 4/2005 | Cragun | G06F 16/24573 707/999.102 |
| 2012/0239623 A1 * | 9/2012 | McCann | G06F 16/11 707/E17.007 |
| 2016/0307274 A1 * | 10/2016 | Sweeney | G06Q 40/08 |
| 2018/0091586 A1 * | 3/2018 | Auradkar | H04L 41/0816 |
| 2020/0097578 A1 * | 3/2020 | Diaconu | G06F 11/203 |
| 2020/0195572 A1 * | 6/2020 | Efimov | H04L 67/10 |

(Continued)

FOREIGN PATENT DOCUMENTS

| | | | | |
|---|---|---|---|---|
| JP | 7159388 B2 * | 10/2022 | | H04L 9/3213 |

OTHER PUBLICATIONS

"Architecture"; WarpStream; downloaded from <https://docs.warpstream/overview/architecture> on Jul. 31, 2024, 6 pages.

(Continued)

*Primary Examiner* — Neveen Abel Jalil
*Assistant Examiner* — Hubert Cheung
(74) *Attorney, Agent, or Firm* — Nicholson De Vos Webster & Elliott LLP

(57) ABSTRACT

Techniques for log storage in distributed data streaming systems are described. A cluster of brokers receive log records from publishers and send log records to subscribers. The log is represented as a group of segments, each segment subdivided into chunks. Metadata describes the log structure. Log records are stored in chunks at least in a remote storage location shared amongst the brokers in the cluster.

20 Claims, 11 Drawing Sheets

OPERATIONS
1000

WRITING A CHUNK OBJECT TO A REMOTE STORAGE LOCATION VIA A NETWORK INTERFACE, THE CHUNK OBJECT INCLUDING RECORDS RECEIVED FROM ONE OR MORE PUBLISHERS OF A DATA STREAM, WHEREIN THE CHUNK OBJECT IS ONE OF A PLURALITY OF CHUNK OBJECTS FORMING A LOG STRUCTURE THAT STORES THE RECORDS OF THE DATA STREAM
1002

RECEIVING A READ REQUEST FROM A SUBSCRIBER OF THE DATA STREAM 1004

IDENTIFYING THE CHUNK OBJECT AS INCLUDING AT LEAST ONE RECORD OF THE DATA STREAM RESPONSIVE TO THE READ REQUEST 1006

READING THE AT LEAST ONE RECORD FROM CHUNK OBJECT IN THE REMOTE STORAGE LOCATION VIA THE NETWORK INTERFACE 1008

SENDING THE AT LEAST ONE RECORD TO THE SUBSCRIBER 1010

(56) References Cited

U.S. PATENT DOCUMENTS

| | | | |
|---|---|---|---|
| 2021/0096955 A1* | 4/2021 | Ajith ................... | G06F 11/1415 |
| 2023/0079486 A1* | 3/2023 | Yarlagadda ........... | G06F 3/0608 |
| | | | 707/694 |
| 2024/0371510 A1* | 11/2024 | Aman ................... | G16H 40/63 |

OTHER PUBLICATIONS

"Client Configuration for Bufstream"; Buf Docs; downloaded from <https://buf.build/docs/bufstream/kafka-compatibility/configure-clients#connecting-to-bufstream> on Jul. 31, 2024, 4 pages.

"Difference with Apache Kafka"; downloaded from <https://docs.automq.com/automq/what-is-automq/difference-with-apache-kafka> on Jul. 31, 2024, 5 pages.

"Difference with Tiered Storage"; downloaded from <https://docs.automq.com/automq/what-is-automq/difference-with-tiered-storage> on Jul. 31, 2024, 3 pages.

Kumar, Abhijeet; "KIP-1023: Follower Fetch From Tiered Offset"; Apache Software Foundation; downloaded from <https://cwiki.apache.org/confluence/display/KAFKA/KIP-1023%3A+Follower+fetch+from+tiered+offset> on Jul. 31, 2024, 7 pages.

"Overview"; AutoMQ; downloaded from <https://docs.automq.com/automq/what-is-automq/overview> on Jul. 31, 2024, 3 pages.

Selwan, Marc; "Introducing Confluent Cloud Freight Clusters"; downloaded from <https://www.confluent.io/blog/introducing-confluent-cloud-freight-clusters/> on Jul. 31, 2024, 10 pages.

* cited by examiner

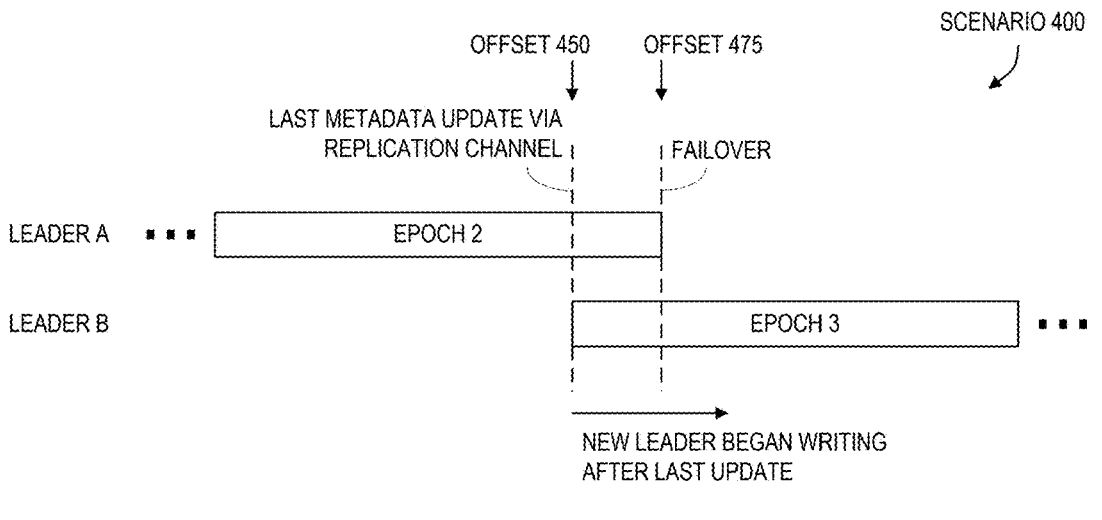
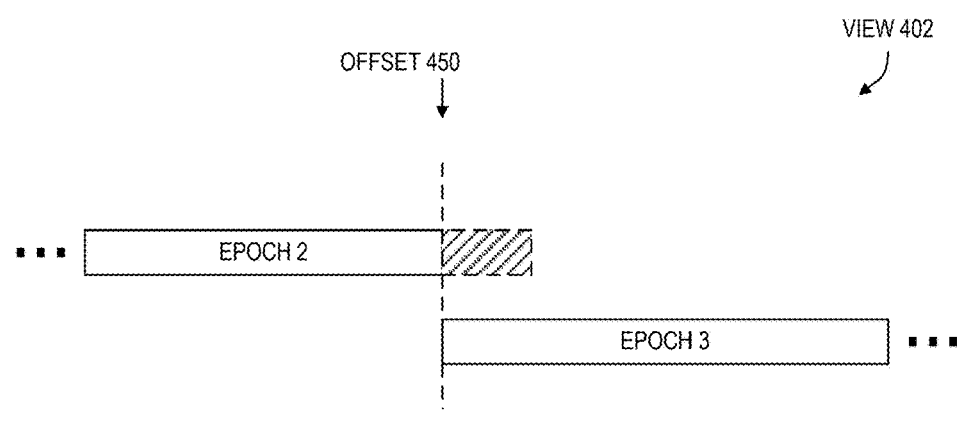
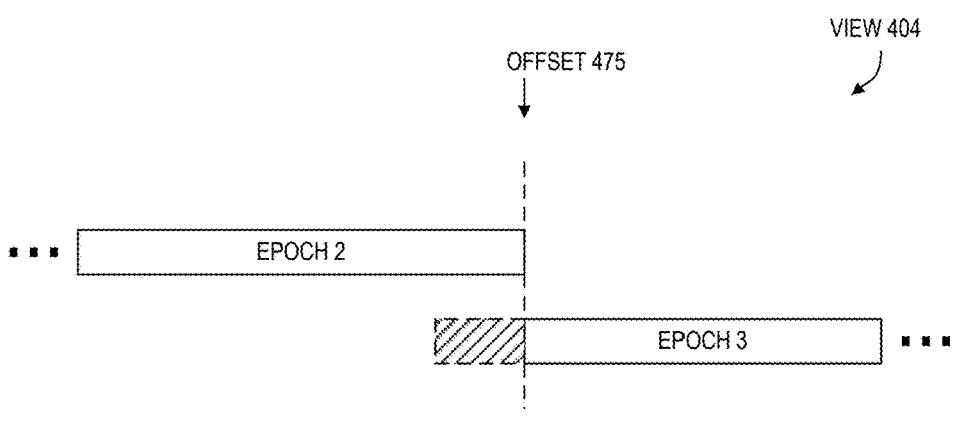
*FIG. 4*

EXAMPLE LOG MANIFEST 700

```
{
"Header": {
    //format version for this entry so that it can be changed later.
    "formatversion" : <format version number>
    "max-leader-epoch" : <maximum leader epoch within this segment group>,
    "start-offset-of-first-segment": <start offset of the current first segment>,
    "start-offset-of-last-segment" : <start offset of the current last segment>,
    "update-count": <a monotonically increasing counter that is incremented everytime this is updated>,
    // revision-string used later for concurrency control
    "revision-string" : <a random string used to identify a particular revision of the segment group manifest>,
    "topic-id" : <hash(cluster id)>-<topic id>,
    "checksum" : <checksum of the header>
},
"creation-time" : <timestamp when segment group was created>,
"modified-time" : <timestamp when a segment group was modified>,
//number-of-segments provides an easy sanity check
"number-of-segments": <the number of segments in the list-of-segments>,
"number-of-deleting-segments" : <the number of deleting segments>,
"list-of-segments": [ {
    "segment-key" : <key to the segment>,
    "leader-epoch-map" : [ {
        "leader epoch" : <leader epoch>,
        "start offset" : <first offset corresponding to that leader epoch within this segment>     702
    } ],
    "start-offset" : <the start offset of the segment>,
    ... other metadata for a segment
    ... , {... any additional segment entries ...} ],
"list-of-deleting-segments": [ {
    "segment-key" : <key to the segment>,
    "deleting-timestamp": <the time at which it was marked for deletion>
} ]
}
```

*FIG. 7*

EXAMPLE SEGMENT MANIFEST 800

```
{
"Headers": {
    //format version for this entry so that it can be changed later
    "format-version" : <format version number>
    "segment-creation-time" : <timestamp when segment was created>,
    "start-offset": <offset of the first record in the segment>,
    "topic-id" : <hash(cluster id)>-<topic id>,
    "checksum" : <checksum of the headers>
},
"leader-epoch-map" : [ {
    "leader epoch" : <leader expoch>,
    "start offset" : <first offset corresponding to that leader epoch within this segment>
} ],
"segment-modified-time" : <timestamp when a segment was last modified>,
    //segment-last-offset updated whenever a log chunk is added
    "segment-last-offset" : <offset of last record>,
    // segment-min-timestamp might be updated whenever a log chunk is added
    "segment-min-timestamp" : <minimum timestamp of any record in the segment,
    // segment-max-timestamp might be updated whenever a log chunk is added
    "segment-max-timestamp" : <maximum timestamp of any record in the segment>,
    // number-of-log-chunks provides an easy sanity check
    "number-of-log-chunks" : <current number of log chunks in the segment>,
    "list-of-log-chunks" : [ {
        "log-chunk-key" : <key to the log chunk>,
        "log-data-bytes" : <number of bytes of log data bytes in the chunk>,
        ... other metadata about each log chunk in the segment
        { ... any additional log chunk entries } ]
},
}
```

OPERATIONS
1000

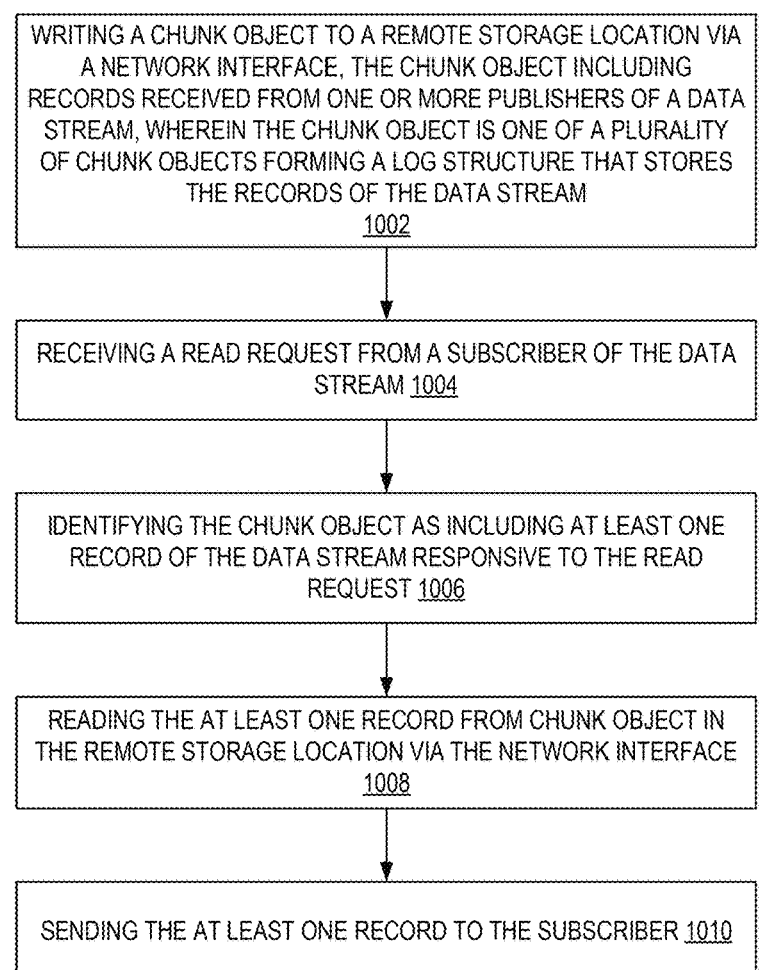

WRITING A CHUNK OBJECT TO A REMOTE STORAGE LOCATION VIA A NETWORK INTERFACE, THE CHUNK OBJECT INCLUDING RECORDS RECEIVED FROM ONE OR MORE PUBLISHERS OF A DATA STREAM, WHEREIN THE CHUNK OBJECT IS ONE OF A PLURALITY OF CHUNK OBJECTS FORMING A LOG STRUCTURE THAT STORES THE RECORDS OF THE DATA STREAM
1002

RECEIVING A READ REQUEST FROM A SUBSCRIBER OF THE DATA STREAM 1004

IDENTIFYING THE CHUNK OBJECT AS INCLUDING AT LEAST ONE RECORD OF THE DATA STREAM RESPONSIVE TO THE READ REQUEST 1006

READING THE AT LEAST ONE RECORD FROM CHUNK OBJECT IN THE REMOTE STORAGE LOCATION VIA THE NETWORK INTERFACE 1008

SENDING THE AT LEAST ONE RECORD TO THE SUBSCRIBER 1010

FIG. 10

LOG STORAGE IN DISTRIBUTED DATA STREAMING SYSTEMS

BACKGROUND

In the context of computer software and systems, a log is a common type of data structure used to record events, processes, or messages that a system or application generates. Logs are commonly used for monitoring, debugging, and auditing purposes. They contain information such as timestamps, error messages, system activities, and other relevant data that helps in understanding and troubleshooting system behavior.

One application of logs is in the context of data streaming. Data streaming is a technology and paradigm used to process and analyze continuous streams of data in real-time. It involves capturing, processing, and/or acting upon sequences of events or data changes more closely to the time that they occur as compared to longer duration data collection and subsequent batch-processing. Data streaming approach is particularly useful for applications that need to respond rapidly to data changes, such as financial transactions, social media interactions, or monitoring systems.

BRIEF DESCRIPTION OF DRAWINGS

Various examples in accordance with the present disclosure will be described with reference to the following drawings.

FIG. 4 illustrates slicing of overlapping segments according to some examples.

FIG. 7 illustrates a log manifest according to some examples.

FIG. 8 illustrates a segment manifest according to some examples.

FIG. 10 is a flow diagram illustrating operations of a method for log storage in distributed data streaming systems according to some examples.

DETAILED DESCRIPTION

Figure 1:
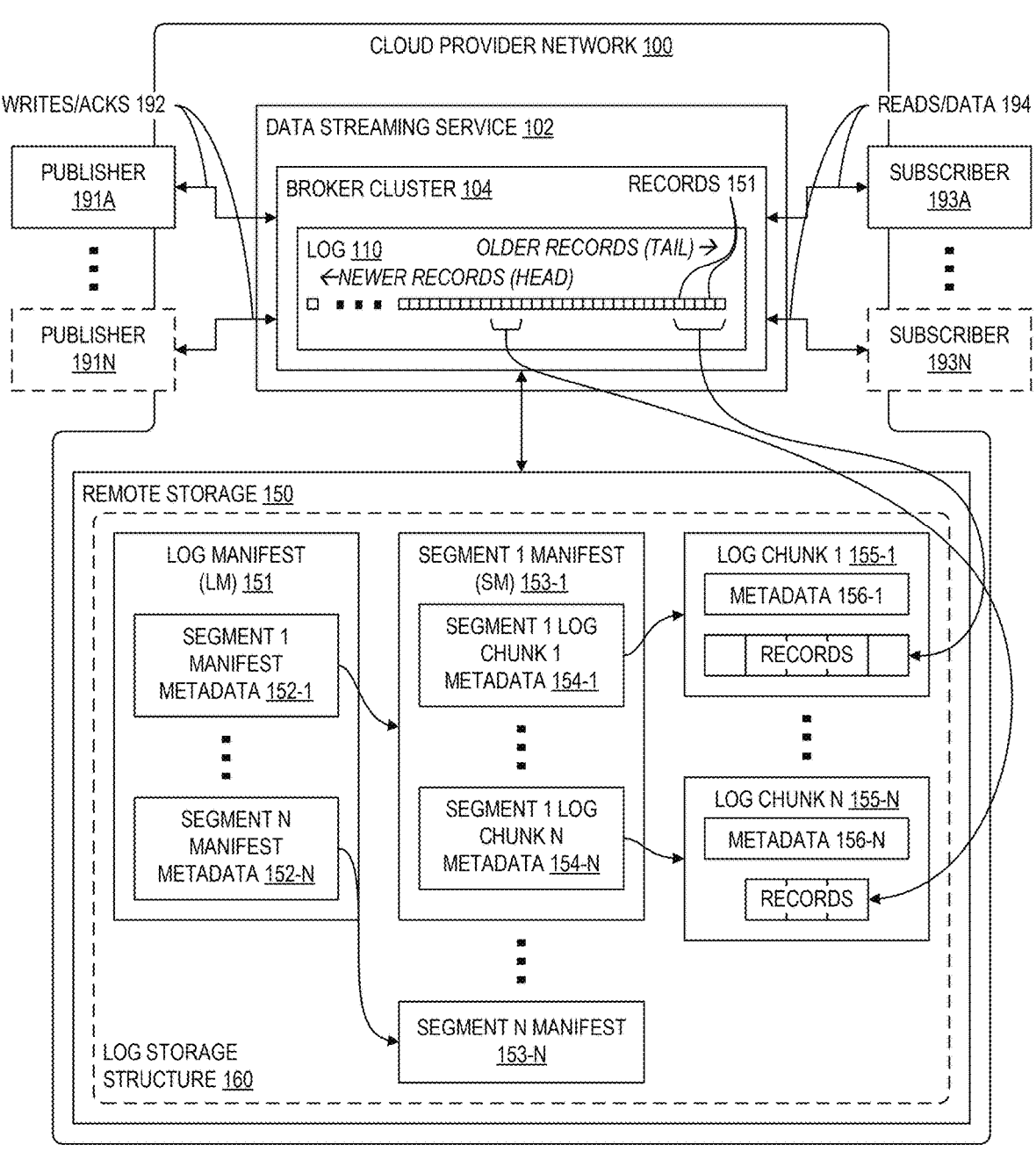
FIG. 1 illustrates an environment for log storage in distributed data streaming systems according to some examples.

The present disclosure relates to methods, apparatus, systems, and non-transitory computer-readable storage media for log storage in distributed data streaming systems. According to some examples, a distributed data streaming system is formed of a cluster of brokers that serve as an intermediary between record publishers and subscribers. The records are stored in a log format, where each record represents a logged event, message, or other data item as published by a publisher. The log is subdivided into chunks, with each log chunk (also referred to as a chunk object or simply "chunk") storing a portion of the logged records. A leader broker in the cluster supports publisher write (or "publish") operations by forming and archiving log chunks in remote storage accessible to the broker cluster. In this context, remote refers to storage accessed via a network interface of a computer system as compared to local storage such as system memory, a storage device accessed via an NVME or SATA interface, or a combination thereof, to name some examples. Both the leader broker and zero or more "follower" brokers can support subscriber read operations by serving records from the log. In some examples, the distributed data streaming systems described herein are provided by a service of a multi-tenant provider network (also referred to as a cloud provider network).

Traditionally, brokers in a cluster each maintained a replica of the log in a local storage location. This practice creates several problems. The compute environment in which the broker application is executed needs to not only have sufficient space to support the size of the log but also sufficient throughput to support both normal write operations as well as cluster resize and recovery operations (e.g., to mirror the log to a new cluster member). These requirements are amplified as the log size increases, such as when a log contains tens or hundreds of gigabytes of records. Additionally, satisfying these capacity and performance requirements can be expensive, whether the underlying compute capacity is maintained by the organization providing the data streaming service or hosted by a third party, such as in a virtualized environment provided by a service of a cloud provider network.

Locally stored logs also present availability and durability problems, particularly during cluster scaling operations (e.g., to add a new broker) or recovery operations (e.g., to replicate the log to a new broker in the event of a broker failure). Consider the scenario where a cluster is being scaled from two to three brokers due to high usage. Copying the log to the new broker further increases the load on the existing brokers, which in turn can cause those brokers to fail to respond to publisher writes to the log or subscriber reads from the log. As another example, if a small cluster has a broker fail (e.g., where the log is replicated across one leader and one follower broker), the chance of data loss increases until another broker is launched and copies over the log from the remaining broker(s).

Chunking a log into smaller pieces and storing them remotely addresses these and other challenges. A new broker-whether launched as part of scaling or recovery-need not copy the full log from an existing broker. Instead, the new broker can begin operations as soon as it has copied any un-archived data from the leader, relying on the archived log data for the remaining log data. The un-archived data is typically a fraction of the total log size, meaning the new broker is able to start serving requests much more quickly after launch and imposes a much smaller increase in load during the copy by virtue of the smaller transfer size. If, for example, log chunks are in the tens of megabytes while the log is gigabytes, the copy operation can involve moving a very small percentage of the overall log size.

In some examples, the log structure is hierarchical, with log chunks serving as the base building block of the log. For example, log chunks can be grouped into log "segments," and the log segments can be grouped into a segment group, with the segment group representing the log. Rather than contain records, the segments and segment group can contain metadata to facilitate streamlined cluster management operations such as restarting a broker, adding brokers, falling over a follower broker to a new leader in the event of leader failure, etc.

One exemplary application of the log storage described herein is the Kafka protocol, such as implemented by Apache Kafka. Kafka is a data streaming protocol in which brokers manage event streams (with different streams logically separated as "topics"). A topic can be divided into multiple partitions to increase throughput. Each partition can be considered a log, although in the case of Kafka, the log can be of finite size with older events truncated from the log tail (e.g., based on event age or log size). Whether a single partition or multiple partitions, the log structure herein can be used to support partitions under the Kafka protocol.

In the streaming as a service use case, multi-tenant (or cloud) customers are using distributed data streaming systems such as Kafka broker clusters for an increasing number of mission-critical use-cases, such as real-time analytics, messaging between applications, and model training for generative AI use cases. As this usage grows, both in size and number, the criticality, scale, and cost of their clusters grow. This growth brings with it a challenge for administrators: maintain the availability and durability of their clusters without letting the cost and operational overhead grow at the same rate. Usually, customers are able to contain either cost or operational overhead, but not both. Some customers contain cost by frequently right-sizing their cluster resources in response to changing application needs to achieve efficient utilization. However, this comes with additional overhead and complexity as right-sizing clusters also requires rebalancing of large volumes of data across brokers. This can take time and increase resource utilization, affecting the overall performance of the cluster. So, customers have to carefully plan and monitor availability and performance when right-sizing. They also have to make sure that occasional failures do not impact writes/reads, which adds further complexity. Other customers prefer operational simplicity and maintain larger capacity buffers, which eliminates the overhead of scaling and rebalancing cluster capacity frequently but results in higher unit costs.

The approaches described herein allow customers to maintain the same availability and durability of their growing clusters, both at lower unit costs and with operational simplicity. Log chunking and remote storage minimizes the data movement when customers add or remove brokers and make scaling in and out many times faster, enabling customers to more frequently and reliably right-size their broker clusters as needed. Similarly, when transient failures happen, recovery consumes a negligible percentage of cluster resources, eliminating the complexity of accurately predicting capacity requirements for recovery operations. As a result, customers do not have to assume the risk of increased resource utilization or the overhead of continuous planning and monitoring that comes with frequently right-sizing cluster capacity. They are able to provision additional capacity just-in-time and better utilize their cluster's resources. Together, these advantages can significantly reduce customers' infrastructure costs.

In some examples, the log chunks are self-describing in that they include metadata that allows recovery of the full log (less any unacknowledged writes). Additionally, the log chunks and other files can be stored in directory structure and with file naming conventions that further support log operations such as recovery, search, access, truncation, etc.

In some examples, the leader broker and its follower brokers leverage a tiered storage architecture that uses both local storage and remote storage. The brokers can accumulate publisher data into log chunks in the local storage, with the leader responsible for archiving log chunks to the remote storage. The local storage allows the leader and followers to respond to subscriber requests for newer, unarchived data. In other examples, the local storage tier can be eliminated, with the leader broker writing published data into chunks in remote storage.

In some examples, the broker cluster can include read-only brokers. These read-only brokers do not participate in replication of incoming data from publishers. Instead, they serve subscribers from archived data in remote storage. These read-only brokers scale the subscriber-side streaming throughput, which can be useful for situations where the fan-out of data stream is large and/or where subscribers can tolerate the small additional delay that arises from the time the leader broker initially receives publisher data until that data is archived into a log chunk in the remote storage.

FIG. 1 is a diagram illustrating an environment for log storage in distributed data streaming systems according to some examples. An exemplary distributed data streaming system is formed by a cluster of brokers 104. The broker cluster 104 maintains the log 110, enabling publishers 191 to write to the log 110 and subscribers 193 to read from the log 110. Note that the publisher and subscriber may be referred to with other terminology, such as producer and consumer.

In this example, publishers 191 write records 151 to the log 110. Records may represent events, messages, or other data items. Publishers 191 may write records 151 individually or in batches. Each record can have an associated offset within the log, where the offset is a monotonically increasing number assigned to the record position within the log 110. The records 151 can have an associated timestamp indicative of the time a publisher produced them. If a log has a maximum size or stores records for a maximum lifetime, the offsets of the log records can be viewed as a sliding window. A short time after creation, a log might have items with offsets 0 through 100, sometime later the log might contain items with offsets 15000 through 17000, and so on. Note that the record offsets may be enumerated in different ways, such as per-record (whether each record represents an individual event or a batch of events) or per-event (e.g., offsets are enumerated for events within a batch).

Records 151 of the log 110 are stored according to a log storage structure 160, with a log chunk serving as the base building block of the log. As publishers 191 write records to the log, the broker cluster 104 accumulates those records into log chunks 155 (or just "chunks"), creating new chunks 155 as needed. As illustrated in chunks 155-1 and 155-N, different chunks may have different numbers of records 151, depending on the size of the record(s) within a chunk and a limit on the size of the chunks, if any. As records are produced, the log chunk that stores the "head" of the log changes over time. Likewise, if log chunks are deleted due to a cap on log size or expiration, the log chunk 155 that stores the "tail" of the log can change over time. Additional details of exemplary broker cluster 104 operations and an exemplary log chunk lifecycle are illustrated and described with reference to FIG. 2.

In some examples, the log chunks 155 can include metadata 156 in addition to log records 151. Exemplary metadata of a log chunk can include items such as indexes to facilitate locating individual records within that log chunk and a location of the next log chunk. An exemplary log chunk structure is illustrated and described with reference to FIG. 9.

In some examples, the log storage structure 160 can include additional metadata structures that describe the log 110. These additional metadata structures can create a hierarchy that can enable coarser log controls such as operations on groups of log chunks and streamline read requests within the log by providing a roadmap for where record offsets exist within the log. In this example log structure 160, log chunks 155 are grouped together into segments. Segments are represented by segment manifests 153. Segment manifests 153 can include metadata 154 such as an identification of and the location of log chunks 155 that form the particular segment. An exemplary segment manifest is illustrated and described with reference to FIG. 8.

In this example, the log structure 160 includes a log manifest 151 that identifies the segments of the log. The log manifest 151 can include metadata 152 such as an identification of and the location of the log segments 153. An exemplary log manifest is illustrated and described with reference to FIG. 7.

Note that in some examples, the chunks 155 can be self-describing in that the additional metadata they contain can be used to re-create the log in full, or, if needed, any additional log structures (e.g., the segments and log manifest). For example, each chunk 155 can include metadata identifying the location of the next log chunk, enabling the both first log chunk (e.g., the one without a reference) and the sequence of chunks to be identified. As another example, the chunks can include metadata identifying the enumerated record offsets contained therein, allowing the log to be re-created by sorting those chunks based on their contained record offsets.

The components of the log storage structure 160 (e.g., chunks and additional metadata such as segment manifests and the log manifest) can be stored in remote storage 150. In this context, remote refers to storage accessed via a network interface of the compute environments executing the brokers as compared to local storage such as system memory and/or a storage device accessed via an NVME or SATA interface, to name some examples. For example, the remote storage 150 may be a network-attached storage device accessible to each of the brokers within the broker cluster 104.

In this example, the broker cluster 104 can be an offering of a data streaming service 102 of a cloud provider network 100, and the brokers can be software applications executed using the resources of the cloud provider network 100, described below. The data streaming service 102 can provide customers of the cloud provider network with the ability to launch and manage broker clusters for data streaming, such as a Kafka cluster where topic partitions are stored as the logs described herein. Publishers and subscribers may be various applications or services executed within and/or outside of the cloud provider network 100.

A cloud provider network (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users can interact with a cloud provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, a hardware virtualization service, a container service, or the like.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In examples implemented in cloud-based environments, these managed compute services can provide the underlying compute environment in which individual brokers of a broker cluster 104 are executed. Individual brokers of the broker cluster 104 can be distributed across AZs to provide fault tolerance. The remote storage 150 can be a storage service of the cloud provider network 100, such as a block- or object-level storage service, where metadata identifying locations of log components (e.g., chunks, segment manifests, etc.) are specified in terms of a locator suitable for the storage service (e.g., a key, a path, etc.). The storage service can maintain the underlying storage devices on which the log components are stored.

Figure 2:
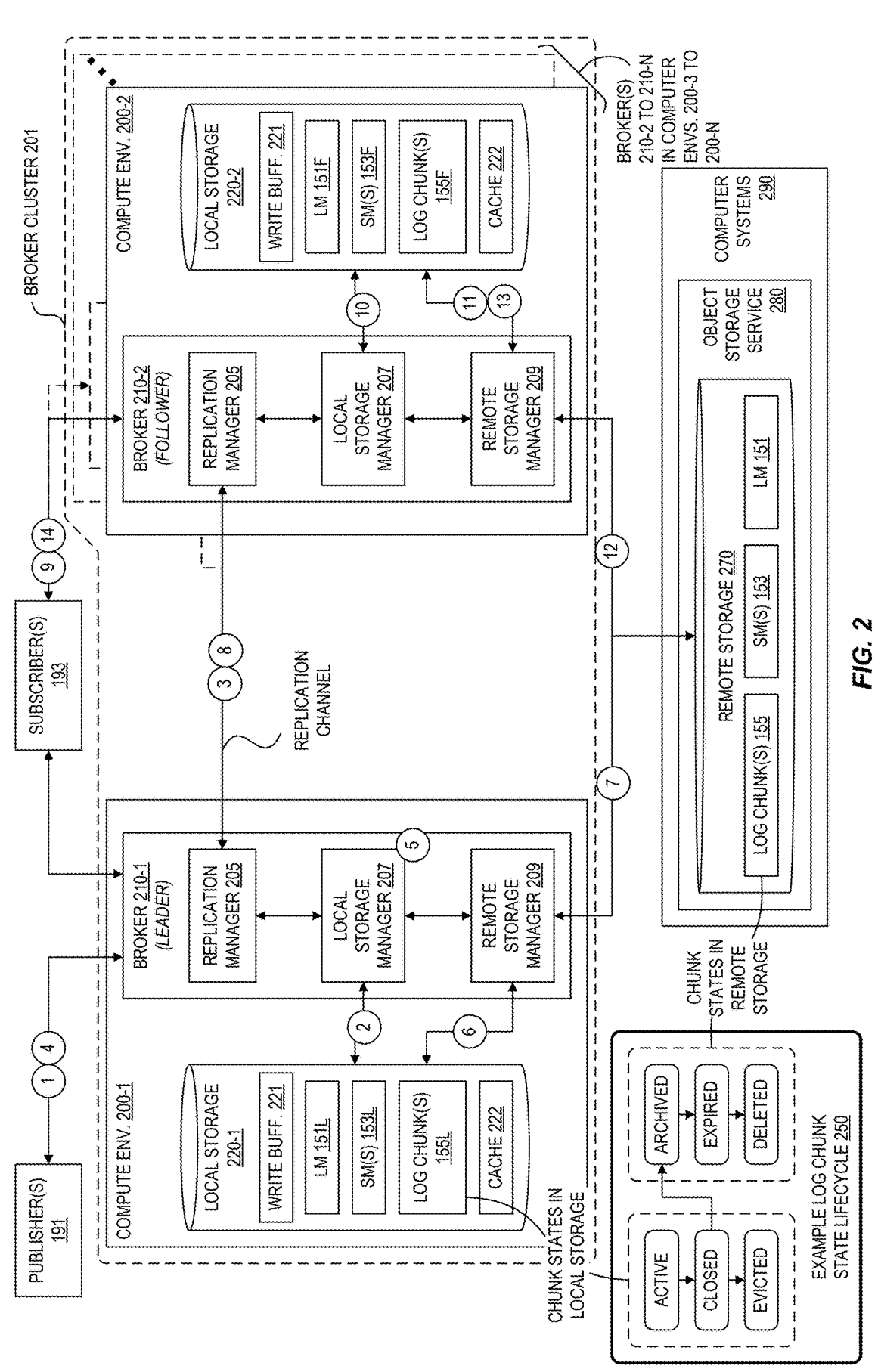
FIG. 2 illustrates an example distributed data streaming system formed of a cluster of brokers.

FIG. 2 illustrates an example distributed data streaming system formed of a cluster of brokers. Here, the broker cluster 201 includes brokers 210-1 through 210-N. Each broker 210 in the broker cluster 201 can be implemented in software executed in a respective compute environment 200-1 through 200-N. Compute environments 200 may variously refer to virtualized or isolated environments such as container and virtual machine or to non-virtualized environments such as operating systems executed on bare metal. Each broker 210 can have access to a tiered storage architecture that includes local storage 220 provided by the compute environment 200 in which the broker is executed and a common remote storage 270. In some examples, the local storage 220 is provided by system memory allocated to the respective compute environments 200. In other examples, the local storage 220 is provided by a combination of system memory and disk (e.g., magnetic or flash-based drives). In a cloud provider network, the remote storage 270 can be provided by a service such as an object storage service 280 that provides storage to objects such as files. Other storage services such as a block storage service can also be used. The object storage service 280 can be executed by other computer systems 290. The compute environments 200 and/or object storage service 280 can be offerings of a cloud provider network (not shown).

As indicated above, a "leader" broker 210-1 supports publisher 191 write operations. The leader 210-1 receives write data, forms log chunks, and archives log chunks in remote storage accessible to each of the brokers in the cluster. Zero or more follower brokers 210-2 through 210-N support subscriber 193 read operations. The leader broker 210-1 keeps the follower brokers 210-2 through 210-N up to date with publisher 191 write data through a replication channel over which the leader sends write data to the followers 210-2 through 210-N. The replication channel is an inter-broker communication pathway (e.g., a network) over which various messages can be sent within the broker cluster. Note that a newly launched follower may have a catch-up period before becoming "synchronized" with the leader. Synchronized followers are candidates that can serve as a new leader in the event of the existing leader failure, sometimes referred to as leader failover.

In some examples, the above follower brokers that synchronize with the leader can be referred to as "in-sync followers." An additional broker type, the "read-only" broker, can support subscriber fetch operations by serving records archived to the log in remote storage. An example read-only broker is described with reference to FIG. 5. These read-only brokers can serve subscriber read operations from the remote storage and thus may not include the latest publisher write data. By contrast, the in-sync follower broker(s) and the leader broker can support subscriber fetch operations from both the log in remote storage and the up-to-date data stored in their respective local storages.

Note that different brokers may be assigned multiple roles for different logs (e.g., Kafka partitions). A leader for one log might be a follower for another log.

An example log chunk state lifecycle 250 is depicted in the lower left of FIG. 2. The leader 210-1 can track a state for each log chunk. For example, in local storage 220-1, the leader 210-1 can progress chunks from "active" to "closed" to "evicted." The leader 210-1 writes publisher write data to an active chunk. Here, write data can refer to record, which may be events or batches of events in a data stream. When one or more threshold conditions are met, the leader closes the currently active chunk and begins a new active chunk. The leader writes closed chunks to remote storage 270. The leader progresses closed chunks in local storage that have been archived to remote storage to evicted, which a broker garbage collection process can then use to identify chunks to delete from the broker's local storage 220. The designation of chunks as evicted may be based on a local retention policy (e.g., evicting chunks when the total amount of local storage or amount of local storage used by closed chunks reaches a threshold amount).

In some examples, the leader can progress chunks in remote storage 270 from the state of "archived" to "expired" to "deleted." The leader can designate chunks as expired based on a maximum log retention policy, which may be user-configured. Such a policy may be based on a duration (e.g., keep records within the last week), a size (e.g., limit the total log size to 100 Gigabytes), or a combination of duration and size (e.g., keep records within the last X hours unless the log size would exceed Y amount). Once expired in local storage, a leader garbage collection process can then use the state to identify chunks to delete from remote storage 270. In other examples, the leader can treat the chunks in remote storage as a monolithic group with their encompassing segment, deleting the segments based on a policy such as described above.

The leader 210-1 can propagate updates to the state of a chunk to followers 210-2 through 210-N through the replication channel. For example, when a chunk is designated as expired in remote storage, the leader can provide such an indication to the followers.

In this example, the brokers include replication managers 205, local storage managers 207, and remote storage managers 209, which can be software applications or processes executed in the respective compute environments 200 of the brokers 210. Replication managers 205 handle the replication of published data across a leader and in-sync followers. Local storage managers generate and store log chunks, including associated metadata, in local storage 220. In the case of the leader broker, the remote storage manager writes log chunks from local storage 220 to remote storage 270. For the other brokers, the remote storage manager handles the fetching of subscriber-requested data from the remote storage 270.

An exemplary set of operational workflows are now described. A write workflow is described with reference to the encircled numbers 1-4, an archive workflow is described with reference to the encircled numbers 5-7, and a read workflow is described with reference to the encircled numbers 9-14.

At circle 1, a publisher 191 sends a publish (or write) request to the leader broker 210-1, the request including record(s) to be written to the log. Note that the request may be sent directly (e.g., by sending the identity of the current leader to publishers and updating it in the event of leader failover) or indirectly (e.g., with a routing layer handling routing of publish requests to the current leader to account for leader failover). At circle 2, the local storage manager 210 of the leader broker 210-1 writes the record(s) to a write buffer 221 in local storage 220-1. At circle 3, the replication manager 205 of the leader broker 210-1 sends the record(s) to the other follower brokers 210 in the cluster, such as broker 210-2. The replication manager 205 of the follower broker 210-2 writes the record(s) to a write buffer 221 in local storage 220-2 and sends back an acknowledgement to the replication manager 205 of the leader broker 210-1. At circle 4, once the leader broker 210-1 receives an acknowledgement from at least one (or some threshold number) of the follower brokers 210-2 through 210-N, the leader broker 210-1 sends an acknowledgement that the publish request has been received to the publisher 191 that originated the request.

At circle 5, the local storage manager 207 of the leader broker 210-1 generates chunks 155L from the records written to the write buffer 221 in local storage 220-1. Generating chunks typically includes assembling the record(s) in the order they were received from publisher(s) 191 and written to the write buffer 221 and generating metadata such as the metadata described with reference to FIG. 9. The local storage manager 207 of the leader broker 210-1 transitions chunks from active to closed and begins a new active chunk when one or more conditions are met. One exemplary condition is the amount of record data stored in the write buffer 221. When the amount of data stored in the record(s) exceed a threshold size, the local storage manager 207 of the leader broker 210-1 can store the accumulated record(s) and associated metadata as a closed chunk in chunks 155L. Another exemplary condition is the age of the data stored in the write buffer 221. For example, when the oldest (or most recent) record(s) stored in the write buffer reaching a threshold age (e.g., minutes, hours, etc.), the local storage manager 207 of the leader broker 210-1 can store the accumulated record(s) and associated metadata as a closed chunk in chunks 155L. Other exemplary conditions include if the encompassing segment of the chunk is being closed as described below and/or if the leader broker 210-1 is being shut down.

During archival, the local storage manager 207 of the leader broker 210-1 notifies the remote storage manager 209 of the leader broker 210-1 when it closes a log chunk. The remote storage manager 209 will read the closed log chunk 155L (at circle 6) from local storage 220-1 and write the chunk to the remote storage 270 (at circle 7). In some examples, the remote storage manager 209 conditions the push of a log chunk 155L to remote storage 270 based on a high watermark being beyond the last offset in the log chunk 155L. The high watermark represents the offset of the last record in the log to be committed (written by a publisher and acknowledged by the leader).

In some examples, the remote storage manager 209 of the leader broker 210-1 can maintain the tail of the log in both the local storage 220-1 and the remote storage 270. The tail can be truncated against based on retention thresholds, such as the age of the oldest records or the amount of stored data. For example, when the amount of storage used by the log chunks 155L exceeds a local storage threshold, the remote storage manager 209 can mark the oldest log chunks as evicted. Similarly, when the amount of storage used by the total size of the log (e.g., the usage in both remote and local storage), the remote storage manager 209 can mark the oldest log chunks as deleted. In some examples, the truncation of the tail in the remote storage can take place at the segment granularity (e.g., marking all of the log chunks in a particular segment as deleted).

During write and archival operations, the remote storage manager 209 of the leader broker 210-1 can maintain metadata in the form of the segment manifest(s) 153L and log manifest 151L. As described herein, the segment and log manifests include metadata that describe the structure of the log. The remote storage manager 209 can periodically write new (in the case of a new segment creation) or updated segment manifests 153L (in the case of the addition of new chunks to an existing segment). Likewise, the remote storage manager 209 can periodically write the updated log manifest 151L.

The remote storage manager 209 also updates the segment and log manifests 153, 151 in the remote storage 270. The segment manifests 153 can be updated with the closure of each log chunk archived to remote storage 270, or at some lower cadence (e.g., every ten log chunks archived). Similarly, the log manifest 151 can be updated each time a new segment is created.

As part of updating the log metadata 151L, 153L in local storage 220-1 and/or the log metadata 151, 153 in remote storage 270, at circle 8 the leader broker 210-1 can send the updated metadata or an indication thereof to the follower brokers 210-2 through 210-N via the replication channel.

The local storage manager 207 of the follower brokers 210-2 through 210-N can generate chunks 155F. These log chunks can be used to begin a new segment in the event of a leader failover. Thus, while the local storage managers 207 of the follower brokers 210-2 through 210-N build log chunks 155F, the respective remote storage managers 209 do not archive log chunks unless one a given broker is designated as the new leader during failover.

Note that the local storage managers 207 of the follower brokers 210-2 through 210-N may not have the same chunk and/or segment boundaries as that of the leader broker 210-1. One reason for this is because the brokers themselves may be added to the broker cluster 201 at different times. Consequently, when a new leader is designated during failover, that new leader may begin a new chunk or segment beginning with an offset different than where the previous leader was in its creation of new chunks or segments. Using the segment and log manifests, the brokers can each maintain a view of the log representing which segments include which records. Because of the aforementioned potential for there to be discrepancies in boundaries, each broker may have a unique view of the log. A view is metadata that the broker uses to identify which chunk in which segment contains a record at a given offset. For example, one broker might have a view that indicates a record with an offset X in the log is found at the end of segment Y, while another broker might have a view that indicates that that record with the offset X is found at the beginning of segment Y+1.

In some examples, to ensure that each broker has an internally coherent view of the log (e.g., without records existing in multiple locations), brokers can perform segment slicing to update their respective views of the log. Follower brokers can update their view of the log upon receipt of the metadata update via the replication channel, while the leader broker can update its view as it updates the log and segment manifests. Additional details on segment slicing are provided with reference to FIG. 4.

The remote storage manager 209 can close a current segment and begin a new segment when one or more conditions are met. As in the case of closing chunks, exemplary conditions include the size of the segment, the age of the oldest (or most recent) record(s) in the segment, and so on.

Turning to read operations, at circle 9 a subscriber 193 sends a read request to a broker 210 in the broker cluster 201, such as the broker 210-2. (Typically, both the leader and follower brokers are able to service read requests.) The read request can identify one or more requested records, typically identified by record offsets or timestamps such as a range of time. Upon receipt of the read request, the broker 210-2 will first check whether the requested records can be retrieved from the local storage 220-2. At circle 10, the local storage manager 207 can check whether the record(s) exist in the chunks 155F in local storage 220-2. If so, at circle 14 the broker 210-2 can read the requested records from the locally stored chunk(s) 155F and send them to the subscriber 193.

If the record(s) are not present in chunks 155F, the local storage manager 207 can pass the request to the remote storage manager 209 so that it can proceed with handling the request. In some examples, the local storage 220-2 may include a cache 222. In some examples, the cache 222 can be implemented as look-ahead cache given records are often read in a sequential manner. At circle 11, the remote storage manager 209 can check whether the requested record(s) are present in the cache 222. If not, the operations continue at circle 12 where the remote storage manager 209 fetches the chunk(s) 155 that contain the requested record(s) from the remote storage 270. To identify those chunk(s) 155, the remote storage manager 209 can use the metadata representing broker 210-2's view of the log to identify which segment(s) include the requested offsets, and the corresponding segment manifest(s) 153F to identify which log chunk(s) 155 to fetch from remote storage. At circle 12, the remote storage manager 209 retrieves the identified log chunk(s) 155 from remote storage 270, storing them in the cache 222 at circle 13. At circle 14, the broker 210-2 can read the requested records from the retrieved chunk(s) and send them to the subscriber 193.

When a new broker is added to a broker cluster, the broker can retrieve the segment and log manifests 153, 151 from the remote storage 270 and begin servicing read requests. If a request is received identifying records not yet archived to a chunk in remote storage, the new broker can request those records (or their encompassing chunk) from the cluster leader. In some examples, the new broker can request from the leader broker all of the accumulated records (or chunks) yet to be archived. In other examples, the new broker can request a subset of those records (or chunks) responsive to subscribe read request that the new broker is processing. In either case manner, the amount of data to be transferred from the leader to a new broker is dramatically reduced as compared to logs lacking a remote storage backing or only persisting complete segments rather than pieces of a segment (chunks).

In some examples, race conditions may arise that can cause metadata loss. For example, there may be scenarios in which there are multiple active leaders (e.g., due to a long pause by one leader triggering a failover to another leader). As another example, there may be concurrent processes updating the same metadata (e.g., one updating a segment manifest to create a new chunk and another to delete an old chunk). To deal with these cases, restrictions can be imposed on leader brokers' ability to update metadata. One exemplary restriction is a locking mechanism in the remote storage 270 such as updates being performed using an atomic read-modify-write operations to ensure no two leaders or processes are updating concurrently. Another exemplary restriction is a version control where writes are conditional. For example, a leader or process can fetch the current version of the metadata object (e.g., the log or segment manifests 151, 153) from the remote storage 270 (or other version control data source, such as a database), with a later attempt to update the metadata object conditioned on the current version remaining unchanged.

Figure 3:
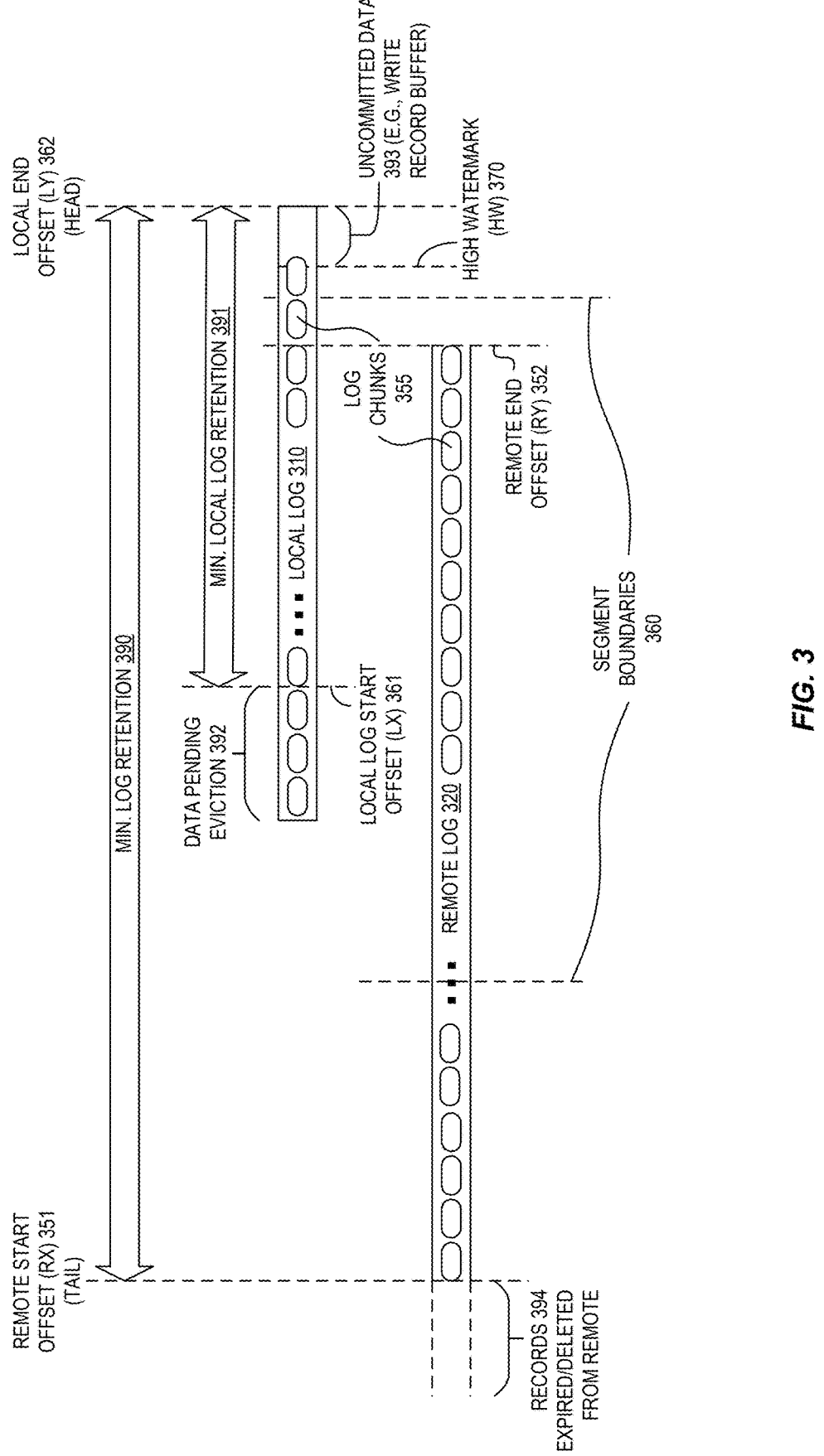
FIG. 3 illustrates various offsets used to track a log across tiered storage with both local and remote storage according to some examples.

FIG. 3 illustrates various offsets used to track a log across tiered storage with both local and remote storage according to some examples. As indicated, a log can be represented by records having associated offsets. In a tiered storage structure having both local storage and remote storage, the broker cluster can maintain start and end offsets for both the portion of the log 310 in local storage and the portion of the log 320 in remote storage, which may include some overlap. As shown, the log (whether the portion in remote or local storage) is composed of log chunks 355.

In this example, a log extends from a remote start offset (RX) 351 representing the oldest record in the log to a local end offset (LY) 362 representing the most recent offset or the next available offset, depending on implementation. Newer records are reflected in the local log 310, and older records are reflected in the remote log 320. The local log extends from LY 362 to a local start offset (LX) 361. Here, chunks with records older than LX 361 represent data pending eviction from local storage. The remote log extends from RX 351 to a remote end offset RY 352 representing the most recent offset in the latest archived chunk or the next available offset for the next archived chunk, depending on implementation. Here, chunks with records older than RX 351 represent data expired or deleted data.

The local log 391 can span a minimum local log retention amount, which may be a configurable value. The log (spanning both local and remote storage) can span a minimum log retention amount, which again may be a configurable value. These retention amounts may be based on a storage footprint, record age, a combination of storage footprint and record age, or some other value.

In some examples, a high watermark (HW) offset 370 reflects the offset of the last (or next, depending on implementation) record to be committed. In this context, a committed record refers to a record that has been replicated on at least N brokers (e.g., where N=2, the leader and at least one follower). Such records are considered committed to the log, and an associated acknowledgement can be provided by the leader broker to the publisher that provided the records in a write. Uncommitted data 393 can represent the amount of data in a write buffer that has yet to be acknowledged.

Dividing segments of the log into chunks as described by a segment manifest 153 enables segments to span both local and remote storage, such as indicated by the example segment boundaries 360. In this manner, the remote end offset RY can be significantly closer to the head of the log—that is, LY—as compared to systems that archive segments as-a-whole. Consequently, when during failover or the addition of a new broker to a cluster, the amount of data to transfer is significantly lessened whether it is the re-sending of write requests for the uncommitted data 393 to a newly designated leader broker or the transmission of the portion of the local log 310 that has yet to be archived to the remote log 310 (e.g., between RY and the high watermark 370).

Records 394 in the remote log with offsets prior to RX are considered expired and flagged for deletion or have already been deleted from remote storage, for example by a garbage collection routine of a leader broker. Similarly, records in the local log with offsets prior to LX 361 are candidates for eviction, for example by garbage collection routines of the brokers in the cluster.

In some examples, each broker in a broker cluster maintains its own LY 362 and LX 361, with the leader broker maintaining RY 352 and RX 351. The follower brokers can track these remote offsets based on the updates sent from the leader over the replication channel, described above.

FIG. 4 illustrates slicing of overlapping segments according to some examples. The top portion of FIG. 4 illustrates a simplified scenario 400 in which failover has occurred. Leader A was assigned epoch 2 and was writing a segment, with Leader B taking over (e.g., in the event of a failover or Leader A shutdown) and continuing to write the segment with epoch 3. An epoch here refers to incremented value used to identify when leader changes occur (e.g., incremented each failover). Here, failover occurred after Leader A wrote chunks up and metadata updates to remote storage up through offset 475. Meanwhile, Leader A had last sent metadata updates to the then-follower Leader B at offset 450. When Leader B takes over, it begins writing the segment beginning with the last known offset 450. As a result, the log in remote storage has an overlapping portion-reflected in the chunks written by Leader A and B and the respective chunk offsets identified in the segment manifest.

To ensure that each broker has a coherent view of the log—with a record having a given offset not appearing in multiple locations—the brokers can perform segment slicing. In some examples, the brokers can perform head slicing, illustrated as view 402. The brokers slice off the archived data from the head of the older epoch such that epoch 2 ended at offset 450 and epoch 3 began at offset 151. Thus, when servicing a read request for offset 155, the broker would refer to the data in epoch 3. In other examples, the brokers can perform tail slicing, illustrated as view 404. The brokers slice off the archived tail from the tail of the newer epoch such that epoch 2 ended at offset 475 and epoch 3 began at offset 176. Thus, when servicing a read request for offset 155, the broker would refer to the data in epoch 2.

Slicing can be a metadata only operation (e.g., using the log and segment manifests maintained by a broker). The log and segment manifests can include metadata related to the start and end offsets of epochs and/or segments, which the brokers can then use in the slicing operation to generate their view of the log.

Although the epoch change is a pseudo-boundary for the above described views, the same slicing mechanism can be applied when there are overlapping segment boundaries, such as when leadership failover creates a new segment rather than continuing with an existing segment (which may be the case in the case of a graceful leader shutdown).

Figure 5:
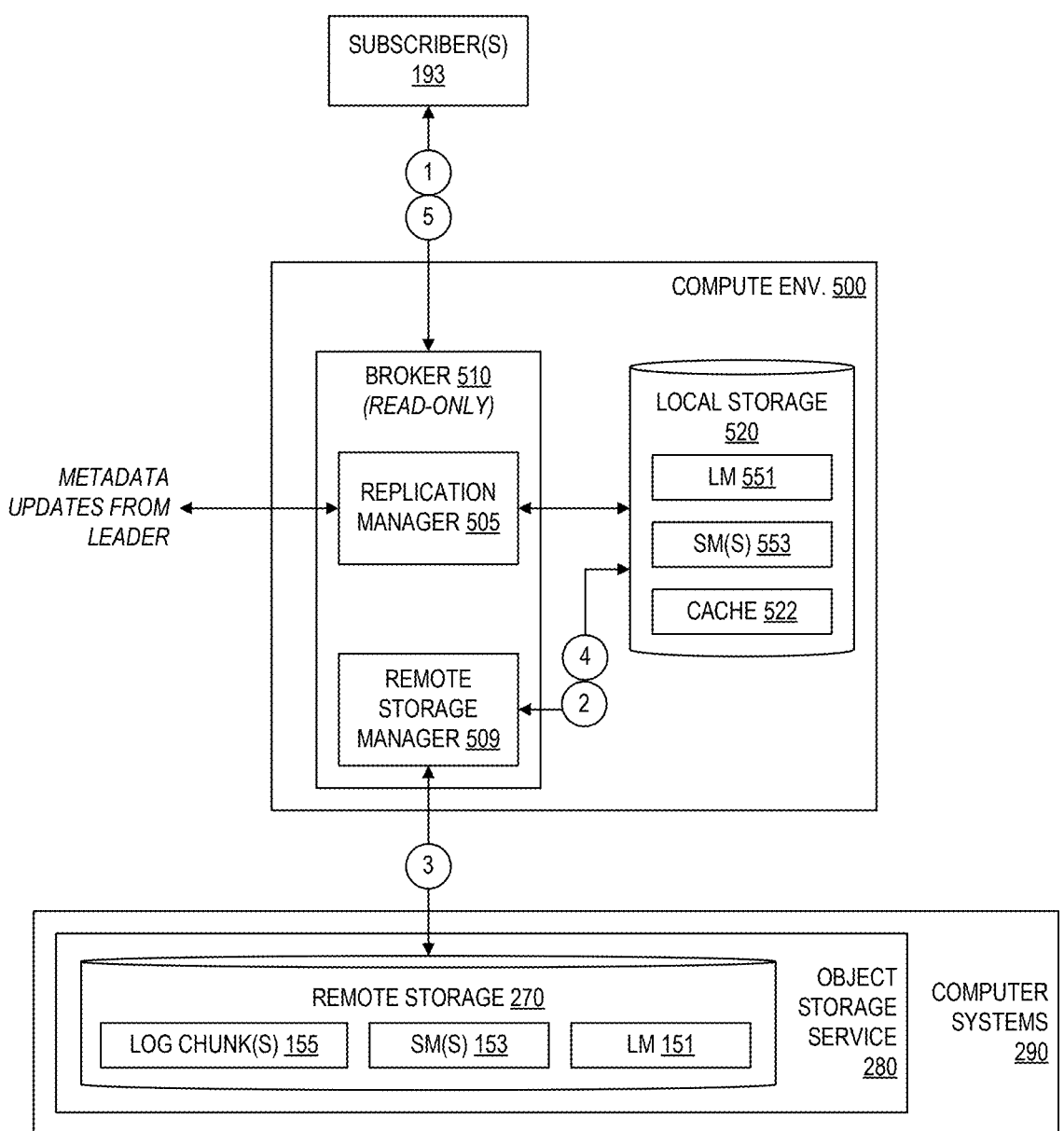
FIG. 5 illustrates a read-only broker according to some examples.

FIG. 5 illustrates a read-only broker according to some examples. As compared to the follower brokers 210-2 through 210-N of FIG. 2, the read-only broker does not participate in data replication. Similar to what is described above, a read-only broker 510 of a broker cluster (not shown) can be implemented in software executed in a compute environment 500. Compute environments 500 may variously refer to virtualized or isolated environments such as containers and virtual machines or to non-virtualized environments such as operating systems executed on bare metal. These read-only brokers can be added to a broker cluster with minimal overhead, allowing for scenarios where there is high read traffic.

In some examples, the leader broker sends metadata updates via a replication channel to a replication manager 505 of a read-only broker 510, which the replication manager 505 uses to update its log and segment 551, 553. In this manner, the read-only broker can service requests up to RY 352 of FIG. 3. In other examples, the replication channel may be omitted with the remote replication manager 505 or remote storage manager 509 periodically polling the log and segment manifests 151, 153 in the remote storage 270 for updates. While simpler omitting the replication channel, the read-only broker may have a delayed view of the data behind RY 352, depending on the frequency that the leader broker updates the log and segment manifests 151, 153. In either case, the read-only broker can build a view of the log to service read requests.

Read requests are generally similar to those described above for FIG. 2 with the notable difference being the absence of chunks in local storage. A read-only broker read workflow is now described with reference to the encircled numbers 1-5. At circle 1, a subscriber 193 sends a read request to the read-only broker 510. The read request can identify one or more requested records, typically identified by record offsets or timestamps such as a range of time. Upon receipt of the read request, the remote storage manager 509 of the read-only broker 510 handles the request. As before, if a cache 522 is present, at circle 2 the remote storage manager 509 can check whether the requested record(s) are present in the cache 522. If not, the operations continue at circle 3 where the remote storage manager 209 fetches the chunk(s) 155 that contain the requested record(s) from the remote storage 270. To identify those chunk(s) 155, the remote storage manager 509 can use the metadata representing broker 510-2's view of the log to identify which segment(s) include the requested offsets, and the corresponding segment manifest(s) 153F to identify which log chunk(s) 155 to fetch from remote storage. At circle 3, the remote storage manager 509 retrieves the identified log chunk(s) 155 from remote storage 270, storing them in the cache 522 at circle 4. At circle 5, the broker 210-2 can read the requested records from the retrieved chunk(s) and send them to the subscriber 193.

Figure 6:
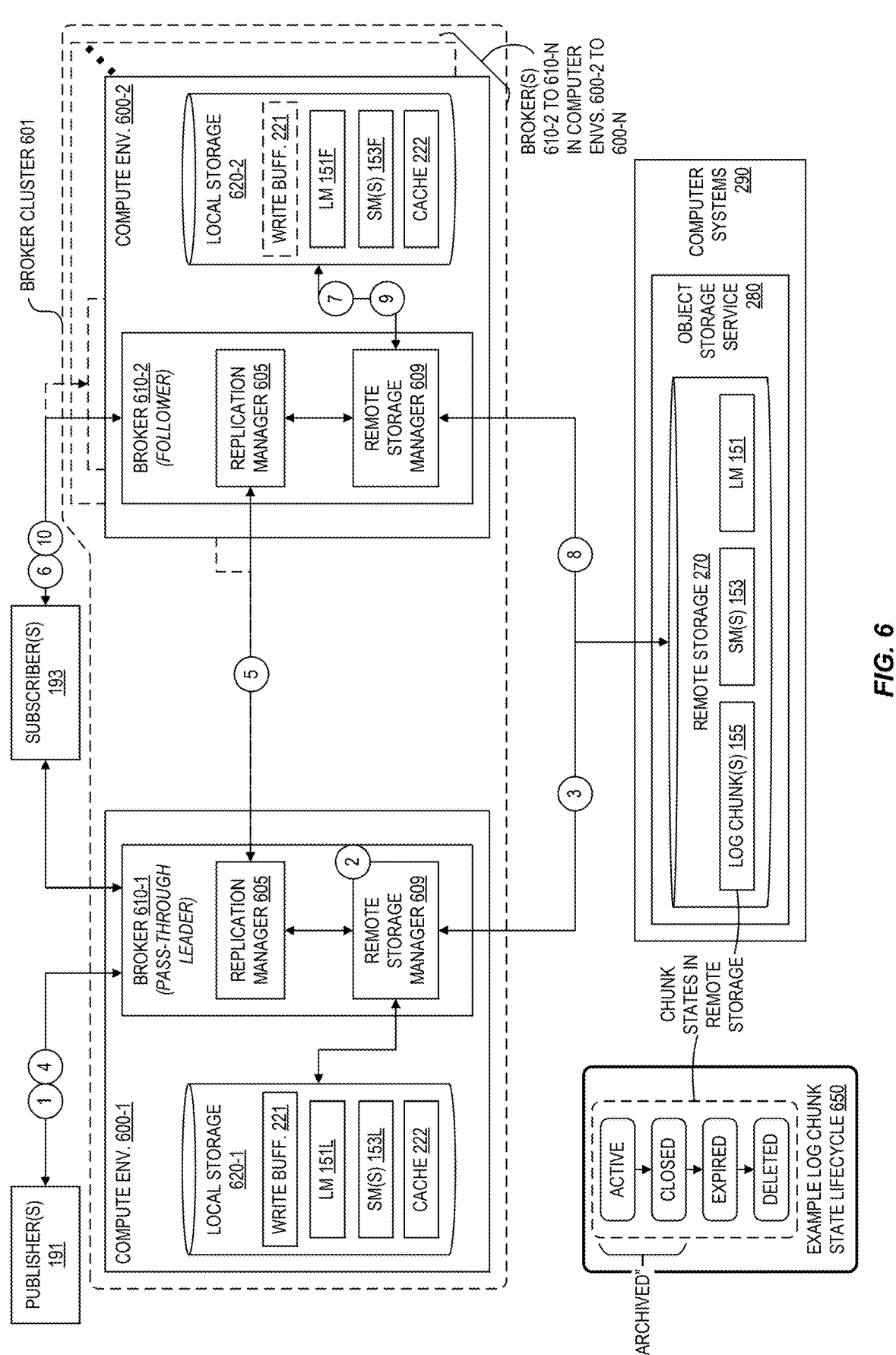
FIG. 6 illustrates a pass-through leader broker according to some examples.

FIG. 6 illustrates a pass-through leader broker according to some examples. Here, a broker cluster 601 includes brokers 610-1 through 610-N, with the broker 610-1 serving as a pass-through leader broker. Pass-through leader brokers reduce the local storage footprint as compared to the leader brokers that generate and store chunks in local storage as described with reference to FIG. 2. In particular, the need for an allocation of storage space for local chunks such as chunks 155L/155F is removed. Again, each broker 610 in the cluster of brokers 601 can be implemented in software executed in a respective compute environment 600-1 through 600-N. Compute environments 600 may variously refer to virtualized or isolated environments such as container and virtual machine or to non-virtualized environments such as operating systems executed on bare metal.

With pass-through leader brokers, the write and archival operations described above are combined. An exemplary set of operational workflows for this example are now described. A write-archive workflow is described with reference to the encircled numbers I-4, and a read workflow is described with reference to the encircled numbers 6-10.

At circle 1, a publisher 191 sends a publish request to the pass-through leader broker 610-1, the request including record(s) to be written to the log. Note that the request may be sent directly (e.g., by sending the identity of the current leader to publishers and updating it in the event of leader failover) or indirectly (e.g., with a routing layer handling routing of publish requests to the current leader to account for leader failover). The pass-through leader broker 610-1 can buffer the record(s) in a write buffer 221, such as described above.

At circle 2, the remote storage manager 609 of the pass-through leader broker 610-1 generates a chunk from the record(s) written to the write buffer 221 in local storage 620-1 and, at circle 3, writes the chunk to the remote storage 270. Again, generating chunks typically includes assembling the record(s) in the order they were received from publisher(s) 191 and written to the write buffer 221 and generating metadata such as the metadata described with reference to FIG. 9. The remote storage manager 609 can generate a chunk when one or more conditions are met. One exemplary condition is the amount of record data stored in the write buffer 221. When the amount of data stored in the record(s) exceed a threshold size, the remote storage manager 609 of the pass-through leader broker 610-1 can generate and write a chunk to log chunks 155 in remote storage 270. Another exemplary condition is the age of the data stored in the write buffer 221. For example, when the oldest (or most recent) record(s) stored in the write buffer reaching a threshold age (e.g., minutes, hours, etc.), the remote storage manager 609 of the pass-through leader broker 610-1 can generate and write a chunk to log chunks 155 in remote storage 270. Other exemplary conditions include if the encompassing segment of the chunk is being closed as described above and/or if the pass-through leader broker 610-1 is being shut down.

At circle 4, once the pass-through leader broker 610-1 has written the buffered record(s) to remote storage 270, the pass-through leader broker 610-1 sends an acknowledgement that the publish request has been received to the publisher 191 that originated the request.

Having a pass-through leader broker can delay the acknowledgement of writes to publishers 191. For example, the pass-through leader broker can withhold write acknowledgements until an active chunk in remote storage is updated with the write data, introducing at least additional network delay. Such may be the case where the chunk object can be appended to in the remote storage. As another example, if chunks are buffered in the write buffer and only pushed to remote storage 270 when one or more threshold conditions for a chunk such as those described above are met, the acknowledgement may be further delayed. In either case, the publisher is responsible for storing the unacknowledged write data during that time. In some examples, such as where is it permissible to have gaps in the records or event stream, the publisher writes may simply be acknowledged with the acceptance of the risk that a failover prior to archival of the write data in a chunk 155 in remote storage 270 may result in data loss.

During the write-archive operations, the remote storage manager 609 of the pass-through leader broker 610-1 can maintain metadata in the form of the segment manifest(s) 153L and log manifest 151L. As described herein, the segment and log manifests include metadata that describe the structure of the log. The remote storage manager 609 can periodically write new (in the case of a new segment creation) or updated segment manifests 153L (in the case of the addition of new chunks to an existing segment). Likewise, the remote storage manager 207 can periodically write the updated log manifest 151L.

The remote storage manager 609 also updates the segment and log manifests 153, 151 in the remote storage 270. The segment manifests 153 can be updated with the closure of each log chunk archived to remote storage 270, or at some lower cadence (e.g., every ten log chunks archived). Similarly, the log manifest 151 can be updated each time a new segment is created.

As part of updating the log metadata 151L, 153L in local storage 620-1 and/or the log metadata 151, 153 in remote storage 270, at circle 5 the pass-through leader broker 610-1 can send the updated metadata or an indication thereof to the follower brokers 610-2 through 610-N via the replication channel.

Read operations at circles 6-10 are similar to the respective operations at circles 1-5 described for the read-only broker 510 of FIG. 5. One difference between a true read-only follower and other followers in a follower cluster is that the read-only follower is typically incapable of serving as a leader in the event of a failover.

FIGS. 7 and 8 respectively illustrate a log manifest and a segment manifest according to some examples. In these examples, the manifests are depicted in JSON format for readability. In an actual implementation, the manifests may be stored in different format(s). Beginning with the log manifest illustrated in FIG. 7, the log manifest 700 is an abstraction of the log that stores a list of all of the segments of the log. Different leaders may have written the segments in the log at different times. The list of segments from the log manifest is typically sufficient to bootstrap a new broker in a broker cluster and provide the new broker with the locations of all the necessary log and indices. In some examples, the log manifest is stored in a location in remote storage with the following path (sometimes referred to as a key in object storage):/logging_service/<hash (broker_cluster-id)>/store/logmanifests/<hash (log-id)>/log-id.sg. The various hashing operations can add entropy to the path which may improve the performance of the remote storage 270 (e.g., by better distributing the log data and metadata within a distributed storage system).

Along with the other metadata displayed, the log manifest 700 includes a list-of-segments 702. In some examples, the list-of-segments 702 can serve as an authoritative description of the log-if a segment is not part of a log manifest's list of segments, then it is not part of a log. Exemplary metadata included in the list of segments can include, for each segment, a key (or path) to the location in remote storage where the segment manifest and chunks are stored, an indication of the leader epochs included in the segment, and a start offset for the segment.

In some examples, the segment manifest for a particular segment is stored in a location in remote storage with the following path (or key):/logging_service/<hash (broker_cluster-id)>/store/segments/<hash (log-id,start offset of segment)>/log-id/<start offset of segment>_<broker-id creating the segment>_<random string>/

Turning to the segment manifest illustrated in FIG. 8, a segment manifest 800 contains metadata about the segment as well as the list of log chunks 802 in the segment. As before, the format of the segment is illustrated in JSON, although other formats can be used.

A segment manifest is typically a mutable object that is updated while a segment is being written to (the segment is active). In some examples, a segment manifest is only updated by the leader broker that created it (whose name, broker-id is part of the segment path). When there is a leadership failover and a new broker becomes the leader, the new leader can start a new segment with a new segment manifest. The old and new segments created by the two consecutive leaders may have overlapping offset ranges but will use two different manifests and different chunks.

In operation, there is typically only one segment active (receiving writes) at a time for a log. The other segments that are no longer receiving writes are called closed segments. The manifests of closed segments can be treated as immutable and are finally deleted when they expire.

As indicated above, when new chunks are created, the segment manifest for an active log segment may not be updated for every log chunk that is written. It might be updated once for a certain number of log chunks and/or based on a minimum time between updates. This can reduce the operational load associated with additional performing the additional writes by the broker and servicing those writes by the remote storage.

Figure 9:
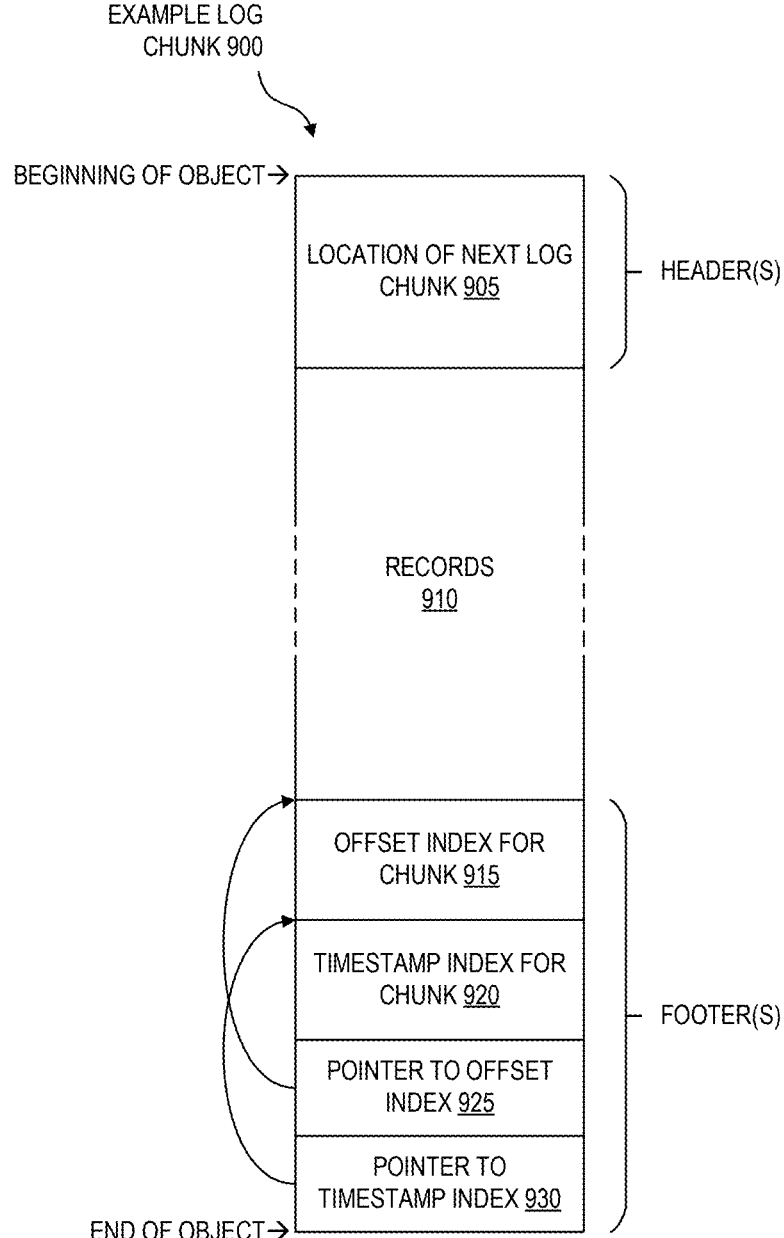
FIG. 9 illustrates a chunk structure according to some examples.

FIG. 9 illustrates a chunk structure according to some examples. An exemplary log chunk is formed and written to remote storage as an object (also referred to as a file), the object including a header portion, zero or more records (or batches of records), and a footer portion. In this example log chunk 900, the header portion includes a location 905 of the next log chunk, zero or more records 910, and the footer portion which includes, beginning from the end of the object, a pointer 930 to a timestamp index, a pointer 925 to an offset index, a timestamp index 920 for records in the chunk, and an offset index 915 for records in the chunk.

A leader broker can write or update the location 905 when it closes the chunk. For example, chunks can be stored as objects or files in remote storage having a name that includes an identification of the first record contained therein. If a chunk began at offset 1,000 and included 100 records, the location and name of the next record can be calculated (e.g., "/{path to chunks in a segment}/offset00001100. logchunk").

The offset and time indices 915, 920 can facilitate faster location of records within the chunk. In some examples, these are sparse indices that do not include an entry for each record or batch, instead providing entries for a select number of records or batches. For example, if the total size of the records is 5 megabytes, the indices may include entries identifying the offsets and timestamps of records near 8 kilobyte boundaries ("near" because records may cross the precise boundaries). As another example, the timestamp index 920 can include an entry every X amount of time, and the offset index 915 can include an entry every Y records. Since the size of the indices can vary, the pointers 925, 930 can be of fixed size to facilitate locating the start of the indices.

When accessing the log chunk, a broker can read a pointer at the end of the object corresponding to the index suitable for responding to a fetch request (e.g., if specified by timestamp or timestamp range, locating the timestamp index 915; if specified by offset index, locating the offset index 920). The broker can then read from the pointer in the index to the nearest or preceding entry in order to find the records responsive to the request. In this manner, brokers can respond to fetch requests without reading the entire log chunk.

Other exemplary header (or footer) fields (not shown) can include a format-version to identify the encoding used to store the chunk, a compression flag to indicated whether the chunk is compressed, a type of compression for the chunk if compressed, a location of the next-log-chunk in the segment (which can be generated when archiving the log chunk because the location of the newly created active log chunk is known), a last-offset of the last record belonging to the chunk, a first-byte-position indicating the number of bytes from the start of segment to the beginning of the first record belonging to the chunk, a last-byte-position indicating the number of bytes from the start of segment to the end of the last record belonging to the chunk, header and/or footer checksum(s). These additional metadata values can aid in data integrity and in broker read speed.

FIG. 10 is a flow diagram illustrating operations 1000 of a computer-implemented method for log storage in distributed data streaming systems according to some examples. Some or all of the operations 1000 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by a leader broker of a cluster of brokers provided by the data streaming service of the other figures.

The operations 1000 include, at block 1002, writing a chunk object to a remote storage location via a network interface, the chunk object including records received from one or more publishers of a data stream, wherein the chunk object is one of a plurality of chunk objects forming a log structure that stores the records of the data stream. The operations 1000 further include, at block 1004, receiving a read request from a subscriber of the data stream. The operations 1000 further include, at block 1006, identifying the chunk object as including at least one record of the data stream responsive to the read request. The operations 1000 further include, at block 1008, reading the at least one record from chunk object in the remote storage location via the network interface. The operations 1000 further include, at block 1010, sending the at least one record to the subscriber.

Illustrative Systems

Figure 11:
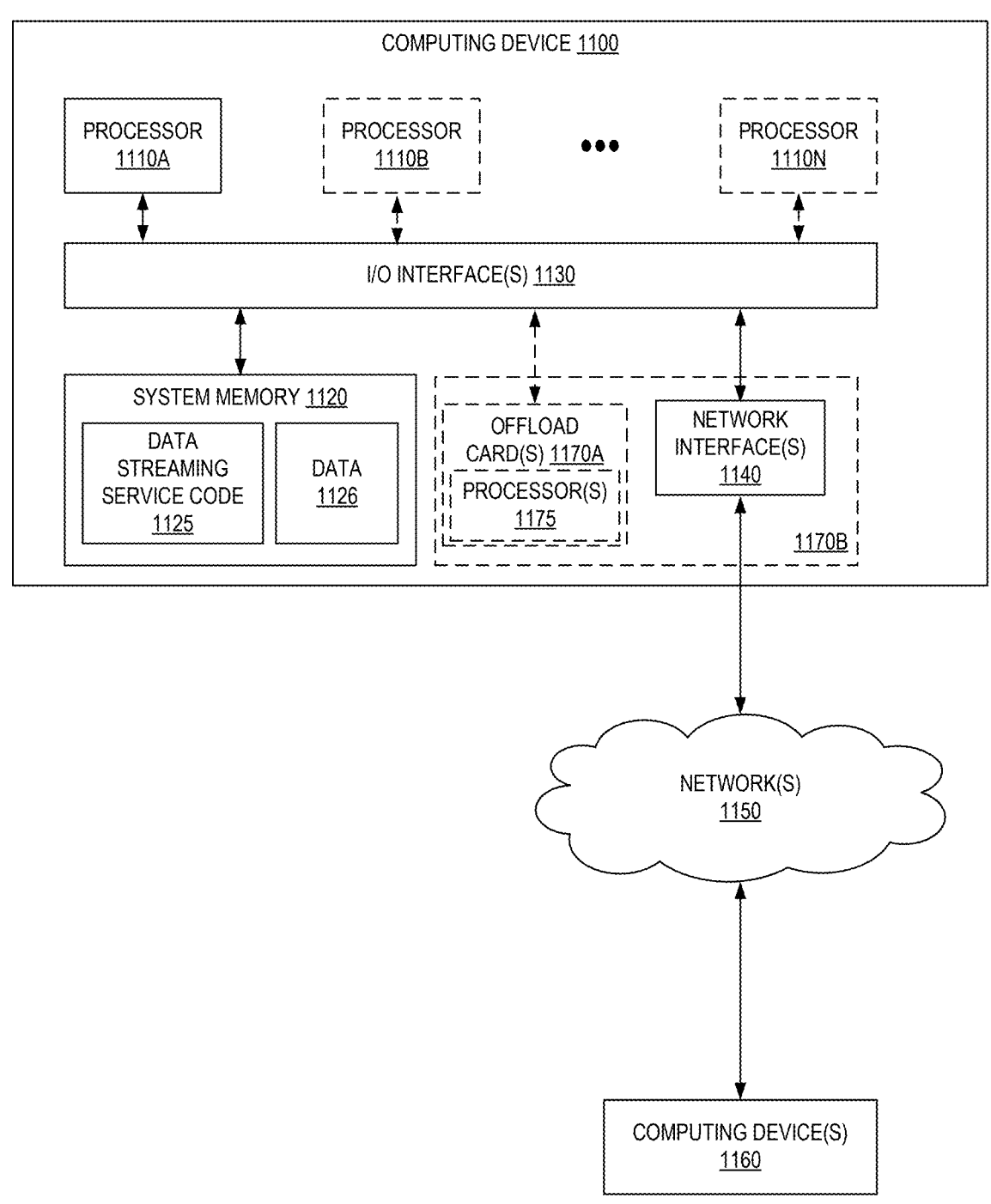
FIG. 11 is a block diagram illustrating an example computing device that can be used in some examples.

In some examples, a system that implements a portion or all of the techniques described herein can include a general-purpose computer system, such as the computing device 1100 (also referred to as a computing system or electronic device) illustrated in FIG. 11, that includes, or is configured to access, one or more computer-accessible media. In the illustrated example, the computing device 1100 includes one or more processors 1110 coupled to a system memory 1120 via an input/output (I/O) interface 1130. The computing device 1100 further includes a network interface 1140 coupled to the I/O interface 1130. While FIG. 11 shows the computing device 1100 as a single computing device, in various examples the computing device 1100 can include one computing device or any number of computing devices configured to work together as a single computing device 1100.

In various examples, the computing device 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as data streaming service code 1125 (e.g., executable to implement, in whole or in part, the data streaming service 102 such as the various brokers described herein) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computing device 1100 and other computing devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computing device 1100. However, in some examples the virtualization manager implemented by the offload card(s) 1170A or 1170B can accommodate requests from other entities (e.g., from compute instances themselves), and cannot coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 191A-19 IN) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
by a leader broker in a cluster of brokers, providing data streaming from one or more publishers to one or more subscribers:
generating a chunk object by accumulating records received from the one or more publishers in a local storage location of the leader broker, wherein the chunk object is one of a plurality of chunk objects forming a log that stores records of a data stream;
grouping the plurality of chunk objects into a plurality of segments;
archiving the chunk object to a remote storage location via a network interface of the leader broker after a number of accumulated records or an elapsed time reaches a threshold; and
updating log metadata to include an identification of the archived chunk object; and
by a follower broker in the cluster of brokers:
generating, using the log metadata, a view of locations of records in the log, wherein the view identifies records in chunk objects stored both in the remote storage location and a local storage location of the follower broker, wherein a particular record of the records appears in at least two segments of the plurality of segments and the view identifies the particular record in only one of the at least two segments;
receiving a read request from a subscriber in the one or more subscribers;
identifying, based at least in part on the view of locations of records in the log, the archived chunk object as including at least one record of the data stream responsive to the read request;

reading the at least one record from the remote storage location via a network interface of the follower broker; and sending the at least one record to the subscriber.

2. The computer-implemented method of claim 1, wherein the cluster of brokers is managed by a data streaming service of a cloud provider network, and further comprising:

launching a new broker to add to the cluster of brokers; and by the new broker, sending a request for records to the leader broker, the request for records in chunk objects that have yet to be archived to the remote storage location.

3. The computer-implemented method of claim 1, wherein the cluster of brokers includes at least one read-only broker, and further comprising, by the leader broker, sending records received from the one or more publishers to the follower broker and not to the read-only broker.

4. A computer-implemented method comprising:

writing, by a first broker in a cluster of brokers implemented by one or more physical computing devices, a chunk object to a remote storage location via a network interface, the chunk object including records received from one or more publishers of a data stream, wherein the chunk object is one of a plurality of chunk objects forming a log structure that stores the records of the data stream;

grouping the plurality of chunk objects into a plurality of segments;

updating log metadata to include an identification of the chunk object;

generating, by a second broker in the cluster of brokers, using the log metadata, a view of locations of records in the log, wherein the view identifies records in chunk objects stored both in the remote storage location and a local storage location of the second broker, and wherein a particular record of the records appears in at least two segments of the plurality of segments and the view identifies the particular record in only one of the at least two segments;

receiving, by the first broker, a read request from a subscriber of the data stream;

identifying, by the first broker, based at least in part on the view of locations of records in the log, the chunk object as including at least one record of the data stream responsive to the read request;

reading, by the first broker, the at least one record from chunk object in the remote storage location via the network interface; and sending, by the first broker, the at least one record to the subscriber.

5. The computer-implemented method of claim 4, further comprising:

obtaining, by the second broker, the log metadata including a log manifest that identifies the log structure as one or more segments and, for each segment, a segment manifest that identifies the plurality of chunk objects included in that segment;

updating, by the second broker using the log manifest and the one or more segment manifests, the view of locations of records in the log;

receiving, by the second broker, a second read request from the subscriber of the data stream;

identifying, by the second broker based at least in part on the view of locations of records in the log, a second chunk object as including at least a second record of the data stream responsive to the second read request;

reading, by the second broker, the at least the second record from the second chunk object in the remote storage location via the network interface; and sending, by the second broker, the at least the second record to the subscriber.

6. The computer-implemented method of claim 4, further comprising, by the first broker, generating the chunk object by accumulating records from the one or more publishers in the local storage location prior to writing the chunk object in the remote storage location.

7. The computer-implemented method of claim 6, further comprising:

receiving, by the first broker, a request from a new broker in the cluster of brokers for accumulated records that have yet to be written to the remote storage location; and sending, by the first broker, the accumulated records that have yet to be written to the remote storage location to the new broker.

8. The computer-implemented method of claim 4, further comprising, by the first broker, sending a metadata update to the second broker in the cluster of brokers, the metadata update including an identification of the chunk object written to the remote storage location.

9. The computer-implemented method of claim 8, wherein the plurality of chunk objects are grouped into a plurality of log segments, and wherein the log structure includes a log manifest that includes metadata identifying each of the log segments and a segment manifest for each of the plurality of log segments, each segment manifest identifying the chunk objects grouped into the segment, and further comprising:

updating, by the first broker, the segment manifest when a new chunk object is added to a log segment; and updating, by the first broker, the log manifest when a new log segment is added to the log structure, wherein the metadata update includes an indication of an update to either the segment manifest or the log manifest.

10. The computer-implemented method of claim 8, wherein the metadata update is sent in response to:

reaching a threshold number of chunk objects written to the remote storage location since a previous metadata update; or reaching a threshold time since a previous metadata update.

11. The computer-implemented method of claim 4, wherein the read request includes an identifier of requested data, the computer-implemented method further comprising determining, by the first broker, a location within the chunk object in the remote storage location from which to begin reading data based on a comparison of the identifier to a record index stored in the chunk object.

12. The computer-implemented method of claim 11, wherein the identifier is a timestamp of a record in the requested data and the record index is a timestamp index.

13. The computer-implemented method of claim 11, wherein the identifier is a record offset of a record and the record index is an offset index.

14. A system comprising:

a first one or more physical computing devices implementing a data storage service in a multi-tenant provider network, the data storage service providing a remote storage location; and a second one or more physical computing devices implementing a first broker in a cluster of brokers in the multi-tenant provider network, the first broker including instructions that upon execution cause the first broker to:

write a chunk object to the remote storage location via a network interface of the second one or more physical computing devices, the chunk object including records received from one or more publishers of a data stream, wherein the chunk object is one of a plurality of chunk objects forming a log structure that stores the records of the data stream;

group the plurality of chunk objects into a plurality of segments;

update log metadata to include an identification of the chunk object;

generate, by a second broker in the cluster of brokers, using the log metadata, a view of locations of records in the log, wherein the view identifies records in chunk objects stored both in the remote storage location and a local storage location of the second broker, and wherein a particular record of the records appears in at least two segments of the plurality of segments and the view identifies the particular record in only one of the at least two segments;

receive a read request from a subscriber of the data stream;

identify, based at least in part on the view of locations of records in the log, the chunk object as including at least one record of the data stream responsive to the read request;

read the at least one record from chunk object in the remote storage location via the network interface; and send the at least one record to the subscriber.

15. The system of claim 14, further comprising a third one or more physical computing devices implementing the second broker in the cluster of brokers, the second broker including instructions that upon execution cause the second broker to:

obtain the log metadata including a log manifest that identifies the log structure as one or more segments and, for each segment, a segment manifest that identifies a plurality of chunk objects included in that segment;

update, using the log manifest and the one or more segment manifests, the view of locations of records in the log;

receive a second read request from the subscriber of the data stream;

identify, based at least in part on the view of locations of records in the log, a second chunk object as including at least a second record of the data stream responsive to the second read request;

read the at least the second record from the second chunk object in the remote storage location via the network interface; and send the at least the second record to the subscriber.

16. The system of claim 14, wherein the first broker includes further instructions that upon execution cause the first broker to generate the chunk object by accumulating records from the one or more publishers in the local storage location of the second one or more physical computing devices prior to writing the chunk object in the remote storage location.

17. The system of claim 16, wherein the first broker includes further instructions that upon execution cause the first broker to:

receive a request from a new broker in the cluster of brokers for accumulated records that have yet to be written to the remote storage location; and send the accumulated records that have yet to be written to the remote storage location to the new broker.

18. The system of claim 14, wherein the first broker includes further instructions that upon execution cause the first broker to:

send a metadata update to the second broker in the cluster of brokers, the metadata update including an identification of the chunk object written to the remote storage location.

19. The system of claim 18, wherein the plurality of chunk objects are grouped into a plurality of log segments, and wherein the log structure includes a log manifest that includes metadata identifying each of the log segments and a segment manifest for each of the plurality of log segments, each segment manifest identifying the chunk objects grouped into the segment, wherein the first broker includes further instructions that upon execution cause the first broker to:

update the segment manifest when a new chunk object is added to a log segment; and update the log manifest when a new log segment is added to the log structure, wherein the metadata update includes an indication of an update to either the segment manifest or the log manifest.

20. The system of claim 18, wherein the metadata update is sent in response to:

reaching a threshold number of chunk objects written to the remote storage location since a previous metadata update; or reaching a threshold time since a previous metadata update.

* * * * *